Patented Dec. 20, 1949

2,492,085

UNITED STATES PATENT OFFICE 2,492,085

ALUMINUM CHLOROHYDRATE ASTRINGENT

Carl N. Andersen, Briarcliff Manor, N. Y., assignor to Elizabeth Arden, Inc., New York, N. Y., a corporation of New York No Drawing. Application May 6, 1947, Serial No. 746,322

6 Claims. (Cl. 167—90)

The invention relates to a composition having an astrigent action and to a method for its preparation. More particularly it pertains to an astringent composition containing an aluminum chlorohydrate as an active ingredient and includes correlated improvements and discoveries whereby the properties of such compositions are enhanced.

There are certain compounds which have the property of retarding or eliminating the flow of perspiration, and a number of them are so utilized. For this purpose, is has previously been suggested to apply to certain skin areas, solutions containing an acid reacting salt of a heavy metal, usually a salt of aluminum, especially the chloride and the sulfate. However, salts of zinc, iron, tin and bismuth have also been used. These compounds, in many instances, have been found to have an irritating effect as well as a destructive action upon clothing with which they come in contact. This action causes a decided decrease in the tensile strength of a fabric and particularly when it is subjected to heat, as during ironing. Such a result attends, with an appreciable loss in tensile strength, whether the compound is employed in the form of a solution, an emulsion, or a cream. Further, it has been found that the use of metallic salts of a weak acid does not offer a solution of the problem inasmuch as these compounds do not effectively retard perspiration. Moreover, it has been determined that the use of alkali occasions a lessening or nullifying effect of the compound.

It is an object of the invention to provide a composition of matter having an astringent action and which retards perspiration, thus acting as a deodorant.

Another object of the invention is the provision of a composition of matter having a distinctive astringent action and which is without harmful effect upon fabrics with which it may come in contact.

A further object of the invention is to provide a composition of matter having an astringent and deodorizing action which is without irritating effect upon the skin.

An additional object of the invention is to provide a composition of matter which may be readily, effectively and economically produced, which retains its effectiveness for considerable periods of time and is of pleasing texture and appearance.

A more particular object of the invention is the provision of an astringent composition containing an aluminum chlorohydrate as an essential active ingredient.

A still further object of the invention is the provision of a composition having astringent and deodorant properties which contains a vehicle, a humectant, an emulsifier, and an aluminum chlorohydrate.

An especial object of the invention is to provide a method for the preparation of an astringent composition containing an aluminum chlorohydrate, and which is formed by a combination of stearic acid, propylene glycol, glyceryl monostearate, an aluminum chlorohydrate, and, if desired, a salt of a higher aliphatic alcohol, such as sodium lauryl sulfate.

Other objects of the invention will in part be obvious and will in part appear hereinafter.

The invention accordingly comprises the several steps, and the relation of one or more of such steps with respect to each of the others, and the composition possessing the features, properties, and the relation of constituents, which are exemplified in the following detailed disclosure, and the scope of the invention will be indicated in the claims.

In the practice of the invention, a composition having an astringent action with a retarding or inhibiting effect upon the flow of perspiration, thus acting as a deodorant, may be prepared with the inclusion as an essential active ingredient of an aluminum chlorohydrate in which the ratio of aluminum to chlorine is 2:1. The aluminum chlorohydrate which has been found to give satisfactory results has the following probable formula:

$$Al_6(OH)_{15}-Cl_3$$

This compound, it will be noted, in comparison with aluminum chloride, which is a salt of a strong acid, is a salt of a more complex and also a weaker acid. The composition includes desirably a vehicle, a humectant and an emulsifier. These various components may consist of single compounds, or they may be in the form of compatible admixtures. Thus, as a vehicle, there may be employed, a higher fatty acid, such as stearic and palmitic acids, a mineral oil, for example, a white petroleum distillate having a viscosity from about 65–75 at 100° C. and a specific gravity from about 0.835 to about 0.845, beeswax, preferably the white variety, petroleum jelly, spermaceti, ceresin and magnesium or zinc stearate, all of which are unctuous substances. Further, the vehicle may constitute from about 8% to about 15% of the composition with about 11% being preferred.

As an emulsifier, a considerable number of compounds may be utilized as the partial fatty acid esters of a polyhydric alcohol, especially, the higher fatty acids as lauric, myristic, stearic, palmitic and oleic acids esterified with, for example, glycerol, the sugar alcohols, as sorbitol, mannitol and dulcitol and the inner anhydrides or ethers thereof. A partial ester refers to those compounds formed by the reaction of the fatty acid with one or more of the hydroxyl groups of the alcohol but in which there is at least one unreacted hydroxyl group. The compounds of glycerol may be mentioned as examples and specifically the mono esters, as glyceryl monolaurate, monostearate and monopalmitate. More over the emulsifier may be a salt, as sodium or potassium, of a sulfated higher alcohol, such as sodium lauryl sulfate, sodium myristyl sulfate and others of like properties. Additionally the emulsifier, which may be a single compound or a compatible admixture, may be present in an amount from about 6% to about 15%, with about 10% having given satisfactory results.

The humectant which serves to prevent or inhibit drying out of the composition may be a polyhydric aliphatic compound such as the glycols, ethylene, propylene, butylene and their lower polymers, also the polyhydric alcohols, as glycerol, erthyrol, sorbitol, mannitol and dulcitol. These compounds may be present in the composition in amounts from about 3% to 10% with about 5% being preferred.

The aluminum chlorohydrate has been shown to have distinctive astringent properties and markedly so when compared with aluminum compounds previously used, mainly, aluminum chloride and aluminum sulfate. Thus, a 1% solution of aluminum chlorohydrate has as great an astringent action as a 15% solution of aluminum sulfate. This was demonstrated by the shrinkage of skin removed from the abdomen of a freshly pithed frog with the following results:

| Compound | Concentration Percent | Percent Shrinkage |
| --- | --- | --- |
| Aluminum chlorohydrate | 5 | 26.2 |
|  | 10 | 30.7 |
|  | 15 | 32.4 |
| Aluminum sulfate (18H$_2$O) | 5 | 16.3 |
|  | 10 | 10.6 |
|  | 15 | 11.9 |

Furthermore, the percentage of aluminum chlorohydrate in the composition may be from about 5% to about 20%, with about 15% being preferred. In addition to one or more of the foregoing ingredients, the composition contains water which is present usually in preponderant amount.

As an illustrative embodiment of a manner in which the invention may be practiced, the following examples are presented. The parts are by weight.

*Example 1*

| | Parts |
| --- | --- |
| Stearic acid—triple pressed | 200 |
| Mineral oil | 20 |
| Beeswax | 20 |
| Glyceryl monostearate | 120 |
| Sodium lauryl sulphate | 24 |
| Propylene glycol | 100 |
| Water | 800 |
| Aluminum chlorohydrate | 300 |
| Water | 300 |

The above mentioned ingredients may be combined in the following manner: Stearic acid, beeswax, mineral oil and glyceryl monostearate are melted at a temperature of about 80° C. The sodium lauryl sulfate is dissolved in 800 parts of water and the propylene glycol is added thereto. This solution is heated to approximately 80° C. whereupon it is added to the stearic acid mixture. This mass is heated substantially to the boiling point and maintained at that temperature for about two minutes. It is then agitated slowly until the emulsion so produced sets. When the temperature of the mass reaches room temperature i. e., about 20°–25° C. requiring usually about 16 hours, a solution of the aluminum chlorohydrate in the remaining 300 parts of water is added slowly with agitation. The mass following the addition of the aluminum chlorohydrate solution is homogenized and then allowed to set or solidify. Prior to packing into jars or other desired container, the mass is milled and cooled. The temperature subsequent to the addition of the aluminum chlorohydrate should not rise above room temperature, i. e., from about 20° to about 25° C.

The foregoing procedure yields a product which is of uniform consistency, which spreads easily and vanishes when applied to the skin. Further, the composition is of even and uniform texture and of pleasant appearance and hand. Furthermore, the emulsifier, in the above instance, the glyceryl monostearate and sodium lauryl sulphate, desirably possesses hydrophilic and lipophilic properties so that all the water and oil are brought into a true and stable form of emulsion, such that the emulsion form persists over extended periods of time.

It will be realized that the emulsifier will be varied according to the properties of the various ingredients entering into the composition. When this is done, there will be obtained a maximum stability in the product, and a propylene glycol stearate may be used for this purpose.

The mixtures set forth in the following examples may be prepared in the manner above described in Example 1.

*Example 2*

| | | |
| --- | --- | --- |
| Stearic acid | parts | 200 |
| Mineral oil | do | 20 |
| White beeswax | do | 20 |
| Stabilized glyceryl monostearate | do | 160 |
| Propylene glycol | do | 100 |
| Aluminum chlorohydrate | do | 300 |
| Water | do | 1300 |
| Perfume | cc | 8 |

Stabilization of the glyceryl monostearate is effected by diethyl oleylamide of phosphoric acid.

*Example 3*

| | | |
| --- | --- | --- |
| Stearic acid | parts | 200 |
| Petroleum jelly | do | 30 |
| White beeswax | do | 10 |
| Stabilized glyceryl monostearate | do | 160 |
| Propylene glycol | do | 50 |
| Aluminum chlorohydrate | do | 300 |
| Water | do | 1300 |

*Example 4*

| | | |
| --- | --- | --- |
| Stearic acid | parts | 200 |
| Sodium lauryl sulfate | gms | 12 |
| Condensation product of oleyl alcohol and polyethylene glycol | gms | 12 |
| Spermaceti | parts | 20 |
| Mineral oil | do | 20 |
| Glyceryl monostearate | do | 120 |
| Propylene glycol | do | 100 |
| Aluminum chlorohydrate | do | 300 |
| Water | do | 1300 |
| Perfume | cc | 8 |

Example 5

| | | |
|---|---|---|
| Stearic acid | parts | 200 |
| Mineral oil | do | 20 |
| Stearyl alcohol | do | 40 |
| Stabilized glyceryl monostearate | do | 120 |
| Aluminum chlorohydrate | do | 300 |
| Water | do | 1300 |

Example 6

| | | |
|---|---|---|
| Stearic acid | parts | 200 |
| Mineral oil | do | 20 |
| Stearyl alcohol | do | 40 |
| Stabilized glyceryl monostearate | do | 120 |
| Propylene glycol | do | 100 |
| Aluminum chlorohydrate | do | 300 |
| Water | do | 1300 |

The astringent compositions prepared in the manners above set forth are of a soft, creamy consistency which are non-sticky, spread easily, have a rapid rate of vanishing, and leave no detectable film on the skin. The composition furthermore may be in the form of a solution, an emulsion, or a cream.

The examples illustrate the emulsion in the cream form. If it is desired that the composition be in the form of a solution, the following may constitute its formulation. The parts are by weight:

| | | |
|---|---|---|
| Water | parts | 800 |
| Aluminum chlorohydrate | do | 100 |
| Ethyl alcohol | do | 100 |
| Perfume | per cent | 0.25 |

A distinctive feature of the astringent composition is that the pH value of a 15% solution of aluminum chlorohydrate is 4.38. It is to this high pH value, or low acidity, that the desirable astringent properties are to be attributed without imparting either an irritating action upon the skin or a harmful deteriorating effect upon clothing. When this value is compared with aluminum sulfate, it is found that a 15% solution thereof has a pH value of 2.28 and a corresponding solution of aluminum chloride a pH value of 2.25. Moreover, the aluminum content of a 15% solution of aluminum chlorohydrate is equivalent to a 46% solution of aluminum sulphate and a 33.4% solution of the aluminum chloride, and these solutions have the respective pH values of 2.2 and 1.22.

Furthermore, it has been determined by 24 hour patch testing upon human subjects that a 15% solution of aluminum chlorohydrate does not produce contact dermatitis. No one of the subjects showed any reaction to the solution. Hence such a solution of aluminum chlorohydrate is without irritation. It has also been determined that the aluminum chlorohydrate is substantially without action upon various textile materials as evidenced by the following tabulation which gives the per cent loss in tensile strength when the materials were tested with the aluminum chlorohydrate composition in cream form by the regular procedure as outlined by the American Society of Testing Materials:

| | |
|---|---|
| Wool | 0 |
| Cotton | 1.4 |
| Acetate rayon | 1.3 |
| Viscose rayon | 1.9 |
| Silk | 1.8 |

It may be pointed out by way of comparison that aluminum chloride upon hydrolyses yields hydrochloric acid and that aluminum sulphate yields sulphuric acid. A normal solution of HCl contains 36 grams and that of $H_2SO_4$—49 grams. The amount of sulphuric acid liberated at pH of 2.25 would amount to .27 gm.; and hydrochloric acid of the same pH would amount to .21 gram. Aluminum chlorohydrate with a pH of 3.4 would have approximately 1/15 of the HCl value; with a pH of 3.6, approximately 1/30; and with a pH of 4.24 approximately 1/100. This is believed to account for the non-irritation and lack of deteriorating effect on the tensile strength of various textiles.

The aluminum chlorohydrate, as specified in the foregoing description, may be produced in accordance with the procedure given in British Patent 509,815. The process briefly consists in electrolyzing 30 liters of a 20% solution of aluminum chloride in an electric cell of suitable capacity with utilization of graphite electrodes and an asbestos diaphragm, until the ratio of aluminum to chlorine in the cathode chamber is 1:0.5, that is, 2:1. The liquid in the cathode chamber is separated and dried in vacuo or by atomization, with obtention of a white product which is soluble clearly and without opalescence in water.

Since certain changes in carrying out the above method and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An astringent composition consisting essentially of an aqueous medium in major proportion, and containing an aluminum chlorohydrate in which the ratio of aluminum to chlorine is 2:1 and having the probable formula:

$$Al_6(OH)_{15}Cl_3$$

in proportions to produce an astringent action, and an emulsifier.

2. A composition as defined in claim 1 in the form of an emulsion.

3. A composition as defined in claim 1 in the form of a cream.

4. An astringent composition consisting essentially of an aqueous medium in major proportion, and containing an aluminum chlorohydrate in which the ratio of aluminum to chlorine is 2:1 and having the probable formula: $Al_6(OH)_{15}Cl_3$, in an amount of about 5 to about 20% by weight of the composition whereby an astringent action is produced, and an emulsifier.

5. An astringent composition consisting essentially of an unctuous substance in an amount from about 8 to about 15%, an emulsifier in an amount from about 6 to about 15%, a polyhydric alcohol in an amount from about 3 to about 10%, an aluminum chlorohydrate in which the ratio of aluminum to chlorine is 2:1 and having the probable formula: $Al_6(OH)_{15}Cl_3$, in an amount from about 5 to about 20% whereby an astringent action is produced, and the remainder an aqueous medium.

6. An astringent composition consisting essentially of stearic acid in an amount from about 8 to about 15%, glyceryl monostearate in an amount from about 6 to about 15%, propylene glycol in an amount from about 3 to about 10%, an aluminum chlorohydrate in which the ratio of aluminum to chlorine is 2:1 and having the probable formula: $Al_6(OH)_{15}Cl_3$, in an amount from about 5 to about 20% whereby an astringent action is produced, and the remainder an aqueous medium.

CARL N. ANDERSEN.

REFERENCES CITED

The following references are of record in the file of this patent:

UNITED STATES PATENTS

| Number | Name | Date |
|---|---|---|
| 2,196,016 | Huehn | Apr. 2, 1940 |
| 2,368,075 | Wampner | Jan. 23, 1945 |
| 2,373,198 | Roehrich | Apr. 10, 1945 |
| 2,392,531 | Huehn | Jan. 8, 1946 |

FOREIGN PATENTS

| Number | Country | Date |
|---|---|---|
| 489,769 | Great Britain | Aug. 3, 1938 |
| 509,815 | Great Britain | July 21, 1939 |

OTHER REFERENCES

Govett: Amer. Perfumer and Essential Oil Review, Apr. 1947, pages 365 to 368.

Manuf. Chem., vol. 17, Aug. 1946, page 332.

De Navarre: Chemistry and Manuf. of Cosmetics (1941), pages 263, 264.

Chilson: Modern Cosmetics (1938), page 371.